Patented Feb. 11, 1947

2,415,697

UNITED STATES PATENT OFFICE 2,415,697

METHOD OF MAKING ASPHALT COATING COMPOSITIONS

Edwin C. Knowles, Beacon, and Frederic C. McCoy, New York, N. Y., assignors to The Texas Company, New York, N. Y., a corporation of Delaware No Drawing. Application March 31, 1944, Serial No. 529,042

3 Claims. (Cl. 196—74)

Our invention relates to asphaltic coating compositions, and particularly to improved asphaltic paints, cements, and the like, prepared from air-blown asphalt.

Air-blown asphalt constitutes one of the cheapest film-forming materials for use in coating compositions, and has found widespread use in numerous types of paints, cements, pipe coatings, metal primers, and similar compositions. Air-blown asphalt has numerous advantages over many other bituminous materials for use in such compositions in view of the temperature susceptibility, toughness, abrasion resistance, and weathering properties of the applied films. However, air-blown asphalt has one decided disadvantage for use in coating compositions; namely, its tendency to produce solutions of undesirably high viscosity, or solutions which tend to increase in viscosity on aging. This undesirable viscosity characteristic is more pronounced in some solvents than in others, and is particularly bad in the case of the more volatile petroleum solvents. The initial high viscosity of air-blown asphalt solutions is, of course, undesirable, in view of the resulting low solid content of solutions having viscosities sufficiently low for application by the usual methods, such as spraying, brushing, or dipping. The tendency for such solutions to increase in viscosity is also extremely undesirable, since it may unduly shorten the shelf-life of the products.

We have now found that asphaltic coating compositions which have greatly improved in viscosity characteristics may be prepared from air-blown asphalts, by incorporating in such coating compositions resinous substances of petroleum origin, such as the resinous materials obtained as by-products in the solvent refining of petroleum fractions. The petroleum resins or resin-containing materials generally form viscous solutions of lower original viscosity than corresponding solutions of air-blown asphalt, so that some decrease in viscosity of the latter solutions could be expected by substituting the petroleum resins for a portion of the air-blown asphalt. We have found, however, that the viscosities of solutions of such mixtures of air-blown asphalt-petroleum resins are very much lower than the expected values calculated from the viscosities of the individual solutions. In fact, we have found that the decrease in viscosity is so great in most cases that the petroleum resins, or resin-containing materials, may be incorporated in the asphaltic coating compositions in addition to the usual amount of air-blown asphalt, rather than merely as a substitute for a portion of the latter, without any substantial increase in viscosity of the solution. This unexpected property of the mixed solutions makes possible the production of paints and other coating compositions of much higher solid content at the same application viscosities.

In addition to the advantageous initial viscosity characteristics, we have found that coating compositions prepared from mixtures of air-blown asphalts and petroleum resins have improved aging characteristics, with greatly reduced tendency to liver or gel. Even when employing solvents such as light naphthas, in which air-blown asphalts have a strong tendency to liver, mixtures containing petroleum resins show only a slight increase in viscosity on aging for periods up to 30 days, and the viscosity increase for longer aging periods is very much less than those encountered with straight air-blown asphalt solutions.

In addition to the improved viscosity characteristics of our coating compositions, we have found these compositions to have better weathering properties than corresponding compositions prepared without petroleum resins. In accelerated weathering tests, we have found that in some cases an improvement of 100% in the weathering properties (judged by the number of cycles of the test required for failure of the paint film) may be obtained by the incorporation of as little as 20% of petroleum resins in an air-blown asphalt paint, based on the total film-forming content of the paint.

The resinous materials which are suitable for use in the coating compositions of the present invention may be any resins or resin-containing materials derived from substantially uncracked petroleum fractions. We prefer, however, to use the resins or resinous materials obtained in the solvent refining of lubrication oils or residual oils. Suitable resinous materials may be obtained, for example, as high-boiling vacuum distillates or distillation residues from the distillation of extracts obtained by extracting lubricating distillates with selective solvents. Extracts obtained by the use of any of the known solvents which have selective solvent power for unsaturated and aromatic constituents are suitable sources of resinous materials for our compositions. We generally prefer to use resins derived from furfural extracts.

Another source of suitable resinous materials constitutes the high molecular weight substances precipitated from residual oils by treatment at elevated temperatures with liquefied normally gaseous petroleum hydrocarbons. In the de-asphalting of residual oils by means of liquid propane, for example, an initial precipitate is obtained, which comprises largely asphaltic bodies, but also contains some resins. A second treatment at a more elevated temperature results in a second precipitate which consists largely of resins, but contains some asphaltic products. While the latter type of precipitate is desirable as a more concentrated source of petroleum resins, we have found that the initial precipitate, or a mixture of the two, will produce very satisfactory coating compositions when mixed with air-blown asphalt. Such mixtures of resins and asphaltic materials, obtained by propane de-asphalting and de-resining, may be improved in characteristics by air-blowing prior to mixing with air-blown asphalt for the preparation of coating compositions.

It is thus seen that a wide range of materials containing petroleum resins may be used for the purposes of the present invention, and that such materials may consist principally of resins, or may be crude mixtures containing only a minor proportion of resins. In any formulation of a coating composition containing such materials, the proportion to be used should, of course, be estimated on the basis of the resin content of the material.

The resins or resin-containing materials may differ considerably in physical properties from the air-blown asphalt with which they are to be mixed, without any adverse effect on the resulting coating composition. Generally, however, we prefer to employ resins or resin-containing materials which have softening points of the same magnitude as the softening point of the air-blown asphalt with which such materials are to be mixed.

The amount of resin to be employed in conjunction with air-blown asphalt in our coating compositions may vary over a relatively wide range. The resins have such a pronounced effect upon the viscosity characteristics of the coating compositions, that even small amounts of crude resin-containing materials are effective in this regard. Ratios of air-blown asphalt to resins, ranging from 1/1 to 10/1 will usually be satisfactory, but higher or lower ratios may be desirable in certain cases. When using resin-containing materials such as propane de-asphalting residues, or solvent extract distillation residues, we usually prefer to employ ratios of air-blown asphalt to resin-containing materials ranging from 2/1 to 4/1.

The combinations of air-blown asphalt and petroleum resins are suitable for use in all types of asphaltic coating compositions, such as interior and exterior paints, metal primers, pipe coatings, roofing paints, lap cements, and the like. Except for the incorporation of the petroleum resins, all such coating compositions may be formulated in accordance with prior practice. Any of the usual solvents may be employed, although the advantages of our invention are realized to the greatest extent when employing petroleum hydrocarbon solvents such as the light naphthas commonly used in asphalt paints. Other ingredients of the coating compositions, such as fillers, pigments, drying oils, dryers, etc., may be incorporated in the compositions in accordance with the usual formulations.

Our invention will be further illustrated by the following examples:

EXAMPLE I

An air-blown asphalt having a B. and R. softening point of 195° F. was heated to 400° F., and an equal volume of naphtha was then added with stirring. A similar solution was made of a resinous precipitate obtained in the propane de-asphalting of a residual oil. This material had a B. and R. softening point of 176° F., and zero penetration at 77° F. Various blends of these two solutions were made, as shown in the table below, and the Saybolt furol viscosities were determined at 122° F. for the two solutions and the various blends. The expected viscosities of the blends were calculated in accordance with the method of Epperson & Dunlap (Ind. & Eng. Chem. 24, 1370). The observed and calculated viscosities are given in the table below:

Table I

| Composition of paint | | | Initial viscosity (Saybolt furol, 122° F.) | |
|---|---|---|---|---|
| Air-blown asphalt | Propane de-asphalting residue | Naphtha 200-410° F. | Observed | Calculated |
| Per cent by vol. | Per cent by vol. | Per cent by vol. | Seconds | Seconds |
| 50 | 0 | 50 | 110 | --------- |
| 0 | 50 | 50 | 24 | --------- |
| 40 | 10 | 50 | 34 | 78 |
| 30 | 20 | 50 | 25 | 57 |
| 20 | 30 | 50 | 23 | 42 |
| 10 | 40 | 50 | 23 | 31 |

EXAMPLE II

Paints were prepared by dissolving in 140-410° F., naphtha an air-blown asphalt, and a mixture of the air-blown asphalt and the propane de-asphalting residues employed in Example I. The properties of the asphalt and the resin-containing material and the composition or properties of the mixture are shown in the following table:

Table IIA

| Air-blown asphalt | Propane deasphalting residue | Melting point | Penetration at 77° F. |
|---|---|---|---|
| Per cent by wt. | Per cent by wt. | B. & R. ° F. | Mm. |
| 100 | 0 | 192 | 2.9 |
| 0 | 100 | 176 | 0.0 |
| 80 | 20 | 173 | 2.6 |

The compositions of the resulting paints and the initial viscosities and viscosities of these paints after two and six months' storage are shown in Table IIB.

Table IIB

| Composition of paint | | | Viscosity (Saybolt furol, 77° F.) | | | |
|---|---|---|---|---|---|---|
| Air-blown asphalt | Propane de-asphalting residue | Naphtha 140-410° F. | Initial | 2 mos. | 6 mos. | Increase at 6 mos. |
| Per cent by wt. | Per cent by wt. | Per cent by wt. | Sec. | Sec. | Sec. | Per cent |
| 37.5 | 0.0 | 62.5 | 60 | 153 | 320 | 433 |
| 36.0 | 9.0 | 55.0 | 42 | 75 | 94 | 124 |

The two paints were applied uniformly to aluminum test panels, to give dried films of approximately 0.002 inch in thickness. The coated panels were then subjected to the standard accelerated weathering test in the Atlas Weatherometer. Results of these tests are shown in Table IIC.

Table IIC

| Air-blown asphalt | Propane deasphalting residue | Naphtha 140–410° F. | Weathering of coated panels | | |
|---|---|---|---|---|---|
| | | | Cycles to checking | Cycles to deep cracking | Cycles to metal exposure |
| Per cent by wt. | Per cent by wt. | Per cent by wt. | | | |
| 37.5 | 0.0 | 62.5 | 2 | 5 | 5 |
| 36.0 | 9.0 | 55.0 | 2 | 10 | 10 |

EXAMPLE III

The procedure of Example II was followed, using the same air-blown asphalt and a resinous material comprising distillation bottoms from the distillation of a furfural extract of a lubricating distillate. The properties of the asphalt, resinous material, and blend are shown in Table IIIA below:

Table IIIA

| Air-blown asphalt | Furfural extract bottoms | Melting point | Penetration at 77° F. |
|---|---|---|---|
| Per cent by wt. | Per cent by wt. | B. & R. ° F. | Mm. |
| 100 | 0 | 192 | 2.9 |
| 0 | 100 | 200 | 0.0 |
| 80 | 20 | 167 | 2.5 |

The initial viscosities of the paints, and the viscosities after two and six months' storage are shown in Table IIIB and the results of the accelerated weathering tests are shown in Table IIIC.

Table IIIB

| Air-blown asphalt | Furfural extract bottoms | Naphtha 140–410° F. | Viscosity (Saybolt furol, 77° F.) | | | |
|---|---|---|---|---|---|---|
| | | | Initial S. F. 77° F. | 2 mos. | 6 mos. | Increase at 6 mos. |
| | | | | | | Per cent |
| 37.5 | 0.0 | 62.5 | 60 | 153 | 320 | 433 |
| 32.0 | 8.0 | 60.0 | 48 | 77 | 93 | 94 |

Table IIIC

| Air-blown asphalt | Furfural extract bottoms | Naphtha 140–410° F. | Weathering of coated panels | | |
|---|---|---|---|---|---|
| | | | Cycles to checking | Cycles to deep cracks | Cycles to metal exposure |
| Per cent by wt. | Per cent by wt. | Per cent by wt. | | | |
| 37.5 | 0.0 | 62.5 | 2 | 5 | 5 |
| 32.0 | 8.0 | 60.0 | 2 | 13 | 13 |

EXAMPLE IV

The procedure of Example II was followed, utilizing an air-blown asphalt, a propane deasphalting residue, and a naphtha having somewhat different characteristics from the materials used in Example II. The characteristics of the asphalt and deasphalting residue, and the composition and characteristics of the blend are shown in Table IVA, below:

Table IVA

| Air-blown asphalt | Air-blown propane deasphalting residue | Melting point | Penetration at 77° F. |
|---|---|---|---|
| Per cent by wt. | Per cent by wt. | B. & R. ° F. | Mm. |
| 100 | 0 | 202 | 3.2 |
| 0 | 100 | 268 | 0.05 |
| 75 | 25 | 206 | 1.8 |

The compositions of the paints and the initial viscosities, and viscosities after three months' storage are shown in Table IVB, and the results of the accelerated weathering tests are shown in Table IVC.

Table IVB

| Air-blown asphalt | Air-blown propane deasphalting residue | Naphtha 300–430° F. | Viscosity (Saybolt furol, 122° F.) | | |
|---|---|---|---|---|---|
| | | | Initial | 3 mos. | Increase at 3 mos. |
| Per cent by wt. | Per cent by wt. | Per cent by wt. | | | Per cent |
| 47.0 | 0.0 | 53.0 | 86 | 183 | 113 |
| 36.4 | 12.1 | 51.5 | 106 | 166 | 58 |

Table IVC

| Air-blown asphalt | Air-blown propane deasphalting residue | Naphtha 300–430° F. | Weathering of coated panels | | | |
|---|---|---|---|---|---|---|
| | | | Cycles to checking | Cycles to deep cracking | Cycles to metal exposure | Appearance at 82 cycles |
| Per cent by wt. | Per cent by wt. | Per cent by wt. | | | | |
| 47.0 | 0.0 | 53.0 | 3 | 62 | 67 | Many cracks. |
| 36.4 | 12.1 | 51.5 | 2 | 82 | 82 | Few cracks. |

EXAMPLE V

The procedure of Example IV was followed, utilizing a different resin-containing material, which, in this case, comprises an air-blown residue consisting of the mixed precipitates from a two-stage propane deasphalting and de-resining treatment of a residual oil.

The characteristics of the asphalt and resin-containing material, and the composition and characteristics of the blend are shown in Table VA, below:

Table VA

| Air-blown asphalt | Air-blown deasphalting and deresining residue | Melting point | Penetration at 77° F. |
|---|---|---|---|
| Per cent by wt. | Per cent by wt. | B. & R. ° F. | Mm. |
| 100 | 0 | 202 | 3.2 |
| 0 | 100 | 273 | 0.7 |
| 75 | 25 | 210 | 2.1 |

The composition of the paints, and the initial viscosities and viscosities after three months' storage are shown in Table VB, and the results of the accelerated weathering tests are shown in Table VC.

Table VB

| Air-blown asphalt | Air-blown propane de-asphalting and de-resining residue | Naphtha 300–430° F. | Viscosity (Saybolt furol, 122° F.) | | |
|---|---|---|---|---|---|
| | | | Initial | 3 mos. | Increase at 3 mos. |
| Per cent by wt. | Per cent by wt. | Per cent by wt. | | | Per cent |
| 47.0 | 0.0 | 53.0 | 86 | 183 | 113 |
| 39.3 | 11.7 | 53.0 | 97 | 100 | 3 |

Table VC

| Air-blown asphalt | Air-blown propane de-asphalting and deresining residue | Naphtha 300–430° F. | Weathering of coated panels | | | |
|---|---|---|---|---|---|---|
| | | | Cycles to checking | Cycles to deep cracking | Cycles to metal exposure | Appearance at 86 cycles |
| Per cent by wt. | Per cent by wt. | Per cent by wt. | | | | |
| 47.0 | 0.0 | 53.0 | 3 | 62 | 67 | Very many cracks. |
| 35.3 | 11.7 | 53.0 | 3 | 86 | 86 | Few cracks. |

It is to be understood, of course, that the above examples are merely illustrative, and do not limit the scope of our invention. Air-blown asphalts and petroleum resins or resin-containing materials having characteristics similar to those of the particular materials used in these examples, although differing in source of derivation or in specific numerical properties, can also be employed in paints of the above type, or in other types of asphaltic coating compositions employing petroleum naphtha or other volatile solvents. Additional ingredients such as fillers or other modifying agents may also be incorporated in our coating compositions in accordance with prior practices in the art. In general, it may be said that the use of any equivalents or modifications of procedure, which would naturally occur to one skilled in the art, is included in the scope of our invention. Only such limitations should be imposed on the scope of this invention as are indicated in the following claims.

We claim:

1. A method of preparing an improved asphalt coating composition which comprises dissolving in a naphtha solvent a blend of an air-blown asphalt and a resinous distillation residue obtained from the distillation of a furfural extract of a lubricating oil distillate fraction, which residue possesses a softening point at least as great as that of said air-blown asphalt.

2. A method of preparing an improved asphalt coating composition which comprises dissolving in a petroleum hydrocarbon solvent a blend of an air-blown asphalt and a distillation residue possessing a softening point at least as great as that of said asphalt and obtained from the distillation of a furfural extract of a substantially uncracked petroleum fraction, the ratio of said air-blown asphalt to said distillation residue ranging from 1:1 to 4:1.

3. A method of increasing the solid content of an asphalt coating composition which comprises blending an air-blown asphalt and a distillation residue possessing a softening point at least as great as that of said asphalt and obtained from the distillation of a furfural extract of a lubricating oil and distillate oil fraction in the ratio of said asphalt to said distillation residue of from 1:1 to 4:1, and dissolving said blend in a petroleum hydrocarbon solvent.

EDWIN C. KNOWLES.
FREDERIC C. McCOY.

REFERENCES CITED

The following references are of record in the file of this patent:

UNITED STATES PATENTS

| Number | Name | Date |
|---|---|---|
| 2,188,204 | Marc et al. | Jan. 23, 1940 |
| 2,290,833 | Keyser et al. | July 21, 1942 |
| 2,223,289 | Lyons | Nov. 26, 1940 |
| 2,337,337 | (1) McCluer | Dec. 21, 1943 |
| 2,337,338 | (2) McCluer | Dec. 21, 1943 |
| 1,989,045 | Merrill | Jan. 22, 1935 |
| 2,029,290 | Bray et al. I | Feb. 4, 1936 |
| 2,080,688 | Bray II | May 18, 1937 |
| 2,073,088 | Anderson et al. | Mar. 9, 1937 |
| 2,131,205 | Wells et al. | Sept. 27, 1938 |
| 2,317,150 | Lovell et al. | Apr. 20, 1943 |
| 2,247,371 | Harrison | July 1, 1941 |